(12) United States Patent
Pelletier

(10) Patent No.: US 9,148,320 B1
(45) Date of Patent: Sep. 29, 2015

(54) TRANSCEIVER FRONT-END FOR COMMUNICATION OVER POWER LINES

(71) Applicant: Landis+Gyr Technologies, LLC, Pequot Lakes, MN (US)

(72) Inventor: Dale Scott Pelletier, Crosslake, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 0 days.

(21) Appl. No.: 14/500,685

(22) Filed: Sep. 29, 2014

(51) Int. Cl.
| | |
|---|---|
| H04L 25/08 | (2006.01) |
| H04B 3/54 | (2006.01) |
| H04L 27/00 | (2006.01) |
| H04L 25/02 | (2006.01) |
| H04L 27/26 | (2006.01) |
| H04B 1/10 | (2006.01) |
| H04L 25/03 | (2006.01) |

(52) U.S. Cl.
CPC ............ *H04L 25/08* (2013.01); *H04B 3/542* (2013.01); *H04L 25/028* (2013.01); *H04L 25/0292* (2013.01); *H04L 27/0002* (2013.01); *H04L 27/2647* (2013.01); *H04B 1/1027* (2013.01); *H04L 25/03038* (2013.01)

(58) Field of Classification Search
None
See application file for complete search history.

(56) References Cited

U.S. PATENT DOCUMENTS

| | | | | |
|---|---|---|---|---|
| 3,483,546 | A | | 12/1969 | Ausfeld |
| 3,860,757 | A | * | 1/1975 | Stewart .......................... 370/488 |
| 6,490,328 | B1 | * | 12/2002 | Wu ................................ 375/346 |
| 2002/0196095 | A1 | * | 12/2002 | Kaku et al. ........................ 333/18 |
| 2003/0043027 | A1 | * | 3/2003 | Carson et al. ............. 340/310.01 |
| 2003/0156014 | A1 | * | 8/2003 | Kodama et al. .......... 340/310.01 |
| 2009/0307540 | A1 | * | 12/2009 | Razazian et al. ............... 714/701 |
| 2013/0163683 | A1 | | 6/2013 | Morris et al. |

FOREIGN PATENT DOCUMENTS

| | | |
|---|---|---|
| WO | 2013/096132 A2 | 6/2013 |
| WO | 2013/096135 A1 | 6/2013 |

OTHER PUBLICATIONS

Gao Hongjian, et al, Abstract of "Comparison of different digital front end structures at the OFDM receiver," Power Line Communications and Its Applications (ISPLC), 2013 17th IEEE International Symposium, pp. 263,267, Mar. 24-27, 2013, doi: 10.1109/ISPLC.2013.6525861.

Texas Instruments Data Sheet AFE032 "Power-Line Communications Analog Front-End". SBOS669A—Aug. 2013—Revised Dec. 2013.

* cited by examiner

*Primary Examiner* — Leon-Viet Nguyen
(74) *Attorney, Agent, or Firm* — Crawford Maunu PLLC

(57) ABSTRACT

Various circuits and methods are disclosed for communications over AC power lines. In one example embodiment, a power line communication circuit includes an analog front end having a data-coupling circuit configured to communicatively couple communication signals to and from a set of AC power lines in the power line communication system. The analog front end also includes a noise reduction circuit that is coupled to the data-coupling circuit. The noise reduction circuit is configured to mitigate noise within a communication frequency band of the communication signals by filtering, from the communication signals, at least one frequency that is located outside of the communication frequency band and that has harmonics located within the communication frequency band. A receiver circuit is coupled to the noise reduction circuit and is configured to demodulate data from the communication frequency band of the filtered communication signals.

18 Claims, 3 Drawing Sheets

TRANSCEIVER FRONT-END FOR COMMUNICATION OVER POWER LINES

OVERVIEW

The electrical grid delivers electrical power to consumers using an interconnected power network. Power stations/plants produce electricity from a number of different power sources including, but not limited to, combustible fuels, nuclear fission, water, solar energy and wind. Transmission lines deliver the electricity from the power stations to consumer's premises, which include residential and commercial buildings. Long distance transmission can be carried out using high voltage alternating current (AC) (e.g., on order of hundreds of kilovolts), which is useful for reducing energy loss. Substations include transformers for reducing the voltage (e.g., under 10,000 volts) for subsequent delivery to a local area. The voltage can be further reduced (e.g., down to 120-280 volts) using a local transformer, sometimes referred to as a transformer drum/for for its traditional drum-like shape or as a pad mount, for delivery to a consumer's premises.

Service providers are dependent on proper operation of their respective networks to deliver services to their customers. Often, it can be desirable or necessary to ascertain information regarding the services that are provided. For example, the service provider may want access to daily usage reports to efficiently bill their customers for the resources that are consumed or otherwise utilized by the customers. Therefore, it is important for data specifying resource utilization and other information to be reliably transmitted and/or received at specified intervals.

In power line communication (PLC) networks, endpoints in the network (e.g., meters, load control switches, remote service switches, and other endpoints) can provide updated information (e.g., power consumption information and/or endpoint operating status information) by transmitting data over power distribution lines that also carry alternating current. However, effectively communicating such data can be challenging to accomplish, particularly in a timely manner. Moreover, capabilities of endpoint and other communication devices can be limited, as can aspects of transmission protocols amenable to implementation with PLC data transfer.

SUMMARY

The present disclosure is directed to circuits and methods for communications over AC power lines. According to an example embodiment, a PLC circuit for use in a PLC system is disclosed. The PLC circuit includes an analog front end having a data-coupling circuit configured to communicatively couple communication signals to and from a set of AC power lines in the PLC system. The analog front end also includes a noise reduction circuit coupled to the data-coupling circuit. The noise reduction circuit is configured to mitigate noise within a communication frequency band of the communication signals by filtering at least one frequency that is located outside of the communication frequency band and that has harmonics located within the communication frequency band. A receiver circuit is coupled to the noise reduction circuit and is configured to demodulate data from the communication frequency band of the filtered communication signals.

According to another example embodiment, a method for communicating over a set of AC power lines is also disclosed. Using a data-coupling circuit, communication signals are received from the set of AC power lines. Noise within a communication frequency band of the communication signals is mitigated by filtering at least one frequency that is located outside of the communication frequency band and that has harmonics located within the communication frequency band. Data is demodulated from the communication frequency band of the filtered communication signals.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figure 1:
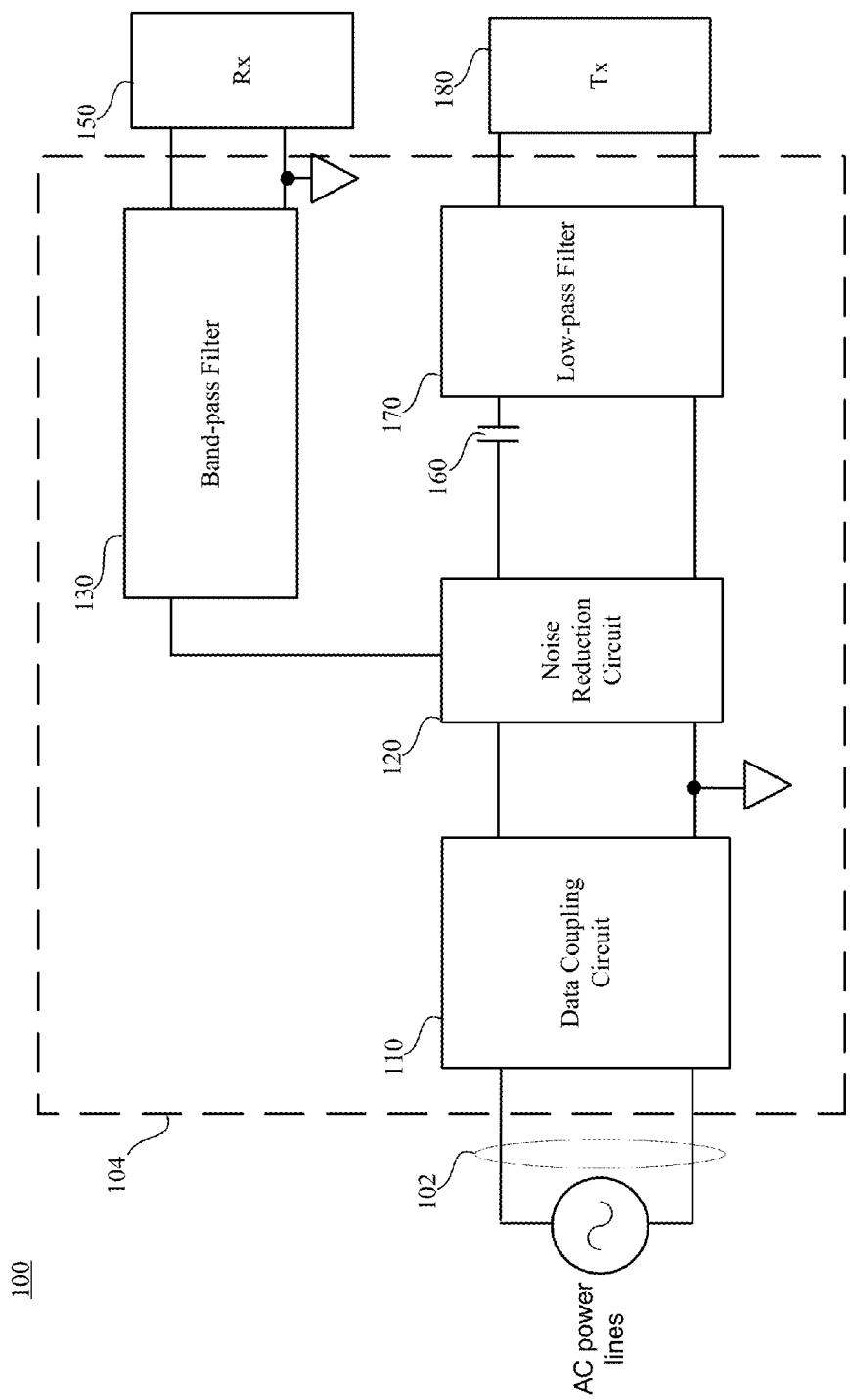
FIG. 1 shows a first circuit for communication in a PLC system, consistent with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving communication over AC power lines in a PLC system. While not necessarily so limited, various aspects may be appreciated through a discussion of examples using this context.

In PLC systems, data is communicated within a designated frequency band. For ease of reference, frequencies within the designated frequency band may be referred to as in-band frequencies, and frequencies outside of the designated frequency band may be referred to as out-of-band frequencies. In processing of communication signals at a receiver, noise present in the out-of-band frequencies may cause a non-linear transfer function exhibited by the receiver to distort one or more in-band frequencies. For example, when the out-of-band signals (e.g., noise) is attenuated by a non-linear transfer function of a receiver, harmonic noise may be induced at one or more harmonic frequencies within the frequency band used for data communication. Additionally or alternatively, attenuation of multiple out-of-band frequency signals may induce intermodulation distortion at various frequencies. Non-linearity may be introduced, for example, as a result of clipping signals which have amplitude that exceeds the voltage range of the receiver. As another example, non-linearity may be introduced by a non-ideal amplifier stage.

Due to the unpredictability and complex interaction of noise at different frequencies, it can be is very difficult, if not impossible, to identify sources of noise that create in-band distortions. For instance, introduction of noise at a particular in-band frequency could result from harmonics of a large number of different frequencies, which are factors of the particular frequencies. Alternatively, introduction of noise at the particular in-band frequency could result from higher-order inter-modular interference from any of a large number of possible combinations of out-of-band frequencies.

The effectiveness of analog circuits for filtering of out-of-band signals at the front end of a receiver is generally considered to be limited. Due to the perceived limitations of analog filters and the large range of out-of-band frequencies to be filtered, it is generally considered to be non-economical to filter out-of-band frequencies using filters in an analog front end. Rather, digital filtering techniques are conventionally employed to remove noise and improve signal quality.

For further discussion of the currently perceived effectiveness of various signal processing techniques for noise reduction, reference may be made to Gao Hongjian; Bumiller, G., "*Comparison of different digital front end structures at the OFDM receiver*," Power Line Communications and Its Applications (ISPLC), 2013 17th IEEE International Symposium, vol., no., pp. 263,267, (24-27 Mar. 2013), which is fully incorporated by reference herein.

Contrary to current design practice, various disclosed embodiments utilize a noise reduction circuit that removes signals from specific out-of-band frequency ranges that have surprisingly been discovered to be a source of harmonic distortion as in-band frequencies in PLC systems. The targeted filtering of specific frequency ranges provides a cost effective method to reduce harmonics that are induced in the communication frequency band by a non-linear transfer function of the receiver.

Various example embodiments are directed to a circuit for use in a PLC system. The circuit includes an analog front end having a data-coupling circuit configured to communicatively couple communication signals to and from a set of AC power lines in the PLC system. The analog front end also includes a noise reduction circuit coupled to the data-coupling circuit. The noise reduction circuit is configured to mitigate noise within a communication frequency band of the communication signals by filtering, from the communication signals, at least one frequency that is located outside of the communication frequency band and that has harmonics located within the communication frequency band. A receiver circuit is coupled to the noise reduction circuit and is configured to demodulate data from the communication frequency band of the filtered communication signals.

In some embodiments, the noise reduction circuit is configured to filter a respective frequency outside of the communication frequency band. For example, the noise reduction circuit may filter an out-of-band frequency at which noise is exhibited by certain devices. For example, it has been unexpectedly discovered that certain devices with heating elements, e.g. induction cooktops, exhibit significant noise at 30 kHz and 60 kHz, which may cause a non-linear transfer function of a receiver to introduce distortion at in-band frequencies. As another example, fluorescent lighting may exhibit significant noise at 80 kHz, which similarly may cause a non-linear transfer function of a receiver to introduce distortion at in-band frequencies. In some embodiments, the noise reduction circuit includes one or more single-tuned shunt filters, each configured to filter out signals of a respective frequency.

The circuits and methods may be adapted for use with various PLC communication protocols, which may utilize various in-band frequency ranges for communicating data. For example, in Japan, PLC systems communicate data in a frequency band extending from 154.6875 kHz to 403.125 kHz. As another example, in the United States, PLC systems communicate data in a frequency band extending from 159.4 kHz to 478.1 kHz. As yet another example, in Europe, PLC systems communicate data in a frequency band extending from 35.9 kHz to 90.6 kHz.

Turning now to the Figures, FIG. 1 shows a first PLC circuit for communication in a PLC system, consistent with one or more embodiments. The PLC circuit 100 includes an analog front end 104 having a data-coupling circuit 110 configured to communicatively couple communication signals to and from a set of AC power lines 102 in the PLC circuit 100. The analog front end 104 also includes a noise reduction circuit 120 coupled to the data-coupling circuit. The noise reduction circuit 120 is configured to mitigate noise within a communication frequency band of the communication signals by filtering, from the communication signals, at least one frequency that is located outside of the communication frequency band.

A receiver circuit 150 is communicatively coupled to the noise reduction circuit 120 and is configured to demodulate data from the communication frequency band of the filtered communication signals. In some implementations, the receiver circuit 150 is communicatively coupled to the noise reduction circuit 120 via a band-pass filter 130. The band pass filter 130 may be configured to further filter out-of-band frequencies of communication signals that are provided to the receiver circuit 150.

In some embodiments, the PLC circuit 100 includes a transmitter circuit 180 configured to transmit data over the AC power lines 102 via the data coupling circuit 110 and noise reduction circuit 120. Some production transmitter circuits, exhibit noise in out-of-band frequencies that may introduce in-band noise in a device that data is transmitted to.

In some implementations, the analog front end 104 includes a low-pass filter and/or a coupling capacitor 160, that communicatively couple the transmitter circuit 180 to the data coupling circuit 110 or noise reduction circuit 120. The low-pass filter may filter, for example, frequencies above the communication frequency band from signals output from the transmitter circuit 180. In some implementations, the band-pass filter 130, the coupling capacitor 160, and/or the low-pass filter 170, may be incorporated into the noise reduction circuit 120.

Figure 2:
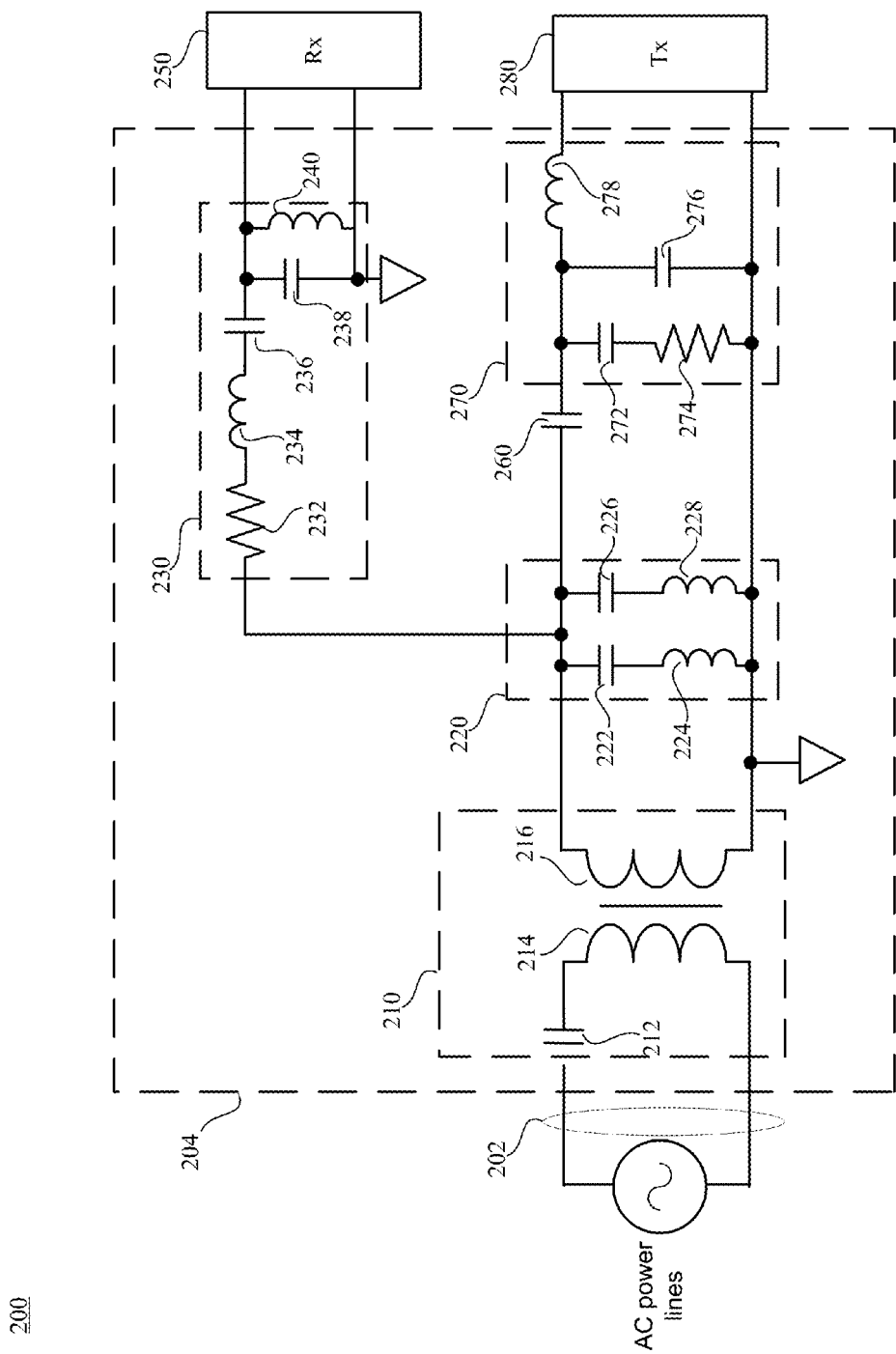
FIG. 2 shows a second circuit for communication in a PLC system, consistent with one or more embodiments.

FIG. 2 shows a second circuit for communication in a PLC system, consistent with one or more embodiments. The PLC circuit 200 includes an analog front end 204 having a receiver circuit 250, a transmitter circuit 280, and an analog front end 204 configured to communicate data from a set of AC power lines 202 to the receiver circuit 250 and from the transmitter circuit 280 to the set of AC power lines 202. The analog front end 204 includes a data coupling circuit 210, a noise reduction circuit 220, a band-pass filter 230, a coupling capacitor 260, and a low-pass filter 270, configured and arranged as discussed with reference to respective elements 110, 120, 130, 160, and 170 in FIG. 1.

The data coupling circuit 210, a noise reduction circuit 220, a band-pass filter 230, a coupling capacitor 260, and a low-pass filter 270 may be implemented using various circuits and filters. In the example implementation shown in FIG. 2, the data coupling circuit 210 includes a transformer having a primary winding 214 connected to the AC power lines 202 on a high-voltage side and a secondary winding 216 connected to the noise reduction circuit 220 on a low-voltage side. In some implementations, the data coupling circuit 210 includes a capacitor 212 connected in series with the primary winding 214 to form a high-pass filter.

The noise reduction circuit 220 may include one of more filters each configured to filter a respective out-of-band frequency. The noise reduction circuit 220 may include active or passive filters of various types and configurations. In the example implementation shown in FIG. 2, the noise reduction circuit 220 includes two passive single-tuned shunt filters configured to filter respective out-of-band frequencies. A first one of the single-tuned shunt filters is formed by a capacitor 222 connected in series with an inductor 224. A second one of the single-tuned shunt filters is formed by a capacitor 226 connected in series with an inductor 228. Various implementations may include more or less filters, which may include other types of filters and/or higher-order filters.

The band-pass filter 230 may be included to further filter out-of-band frequencies of communication signals that are communicated to the receiver circuit 250. The band-pass filter 230 may be constructed using various arrangements of active or passive filters. In the example implementation shown in FIG. 2, the band-pass filter 230 includes a resistor 232, an inductor 234, and a capacitor 236 connected in series along a signal line between the noise reduction circuit 220 and the receiver circuit 250. The example band-pass filter 230 also includes a capacitor 238 and inductor 240 connected in parallel between signal inputs of the receiver circuit 250.

The low-pass filter 270 may be included to further filter high frequency distortion in a communication signal output by the transmitter circuit 280. For instance, the low-pass filter 270 may be configured to filter out-of-band frequency above the communication frequency band. The low-pass filter 270 may be constructed using various arrangements of active or passive filters. In the example implementation shown in FIG. 2, low-pass filter 270 includes an inductor having a first end connected to a first output from the transmitter circuit 280 and a second end connected to the coupling capacitor 260. The low-pass filter 270 further includes a capacitor 276 connected between the second end of the inductor 278 and a reference ground voltage. The low-pass filter 270 further includes a capacitor 272 and a resistor 274 connected in series between the second end of the inductor 278 and the reference ground voltage.

The frequency response of the various circuits in the analog front end 204 is determined by the values of the capacitors, inductors, and/or resistors in the respective circuits. As a specific example implementation, for a receiver and transmitter configured to communicate data in a 150-450 kHz communication frequency band, the band-pass filter 230 may be configured to only pass frequencies in the 150-450 kHz band. Such configuration may be implemented, for example, with a 100Ω resistor 232, a 4.7 µH inductor 234, a 10 µF capacitor 236, a 4700 pF capacitor 238, and a 47 µH inductor 240. For the example 150-450 kHz communication frequency band, the high-pass filter of the data coupling circuit 210 may be configured to have a corner frequency of 150 kHz. Such configuration may be implemented, for example, with a 0.1 µF capacitor 212. For the example 150-450 kHz communication frequency band, the low-pass filter 270 may be configured to have a corner frequency of 450 kHz. Such configuration may be implemented, for example, with a 4.7 µH inductor 278, a 1 µF capacitor 276, a 1 µF capacitor 272, and a 100Ω resistor 274.

As previously indicated, the noise reduction circuit 220 in this example includes two single-tuned shunt filters, each configured to filter respective frequencies outside of the communication frequency band. The frequencies filtered by the single-tuned shunt filters are determined by the values of the capacitor and inductor forming each of the single-tuned shunt filters. Continuing with the 150-450 kHz communication frequency band example, in some implementations, the filters may be respectively configured to filter out-of-band signals in the range of 20 kHz to 60 kHz frequencies. Such configuration may be implemented using a first single-tuned shunt filter having a 2.2 µF capacitor 222 and a 22 µH inductor, and a second single-tuned shunt filter having a 1 µF capacitor 222 and a 10 µH inductor.

Figure 3C:
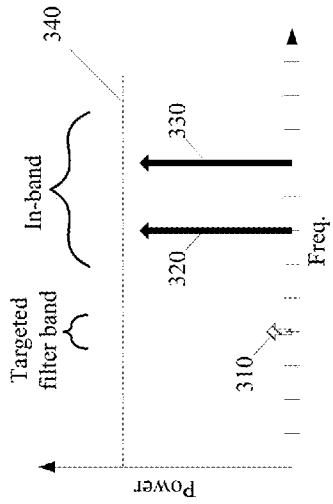
FIG. 3C shows the example set of communication signals of FIG. 3A with out-of-band noise filtered at a targeted frequency.
Figure 3D:
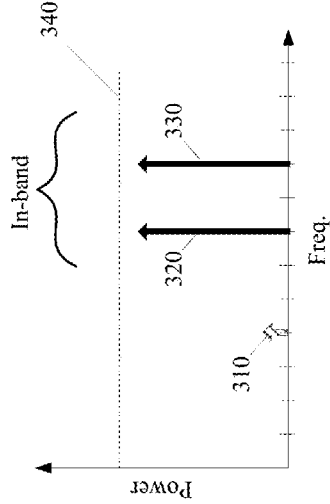
FIG. 3D shows communication signals resulting from processing of the set of communication signals of FIG. 3C by a non-linear transfer function of a receiver.
Figure 3A:
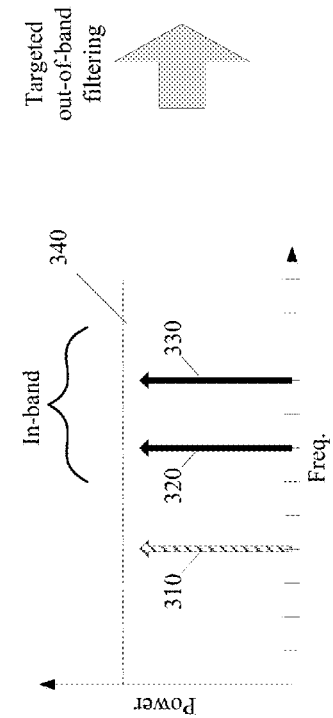
FIG. 3A shows an example set of communication signals that may be communicated over a set of AC power lines.

FIGS. 3A, 3B, 3C, and 3D illustrate the effect of out-of-band noise on in-band communication frequencies with and without targeted out-of-band filtering performed by the noise reduction circuit. FIG. 3A shows an example set of communication signals that may be communicated over a set of AC power lines. In this example, the set of communication signals includes a noise signal 310 and two data signals 320 and 330 at in-band frequencies.

Line 340 illustrates a maximum amplitude of a receiver, beyond which clipping of signals may occur. Initially, it appears that the system will not generate harmonics due to clipping, but the data signaling system must be examined. It may be overlooked that the orthogonal frequency-division multiplexing (OFDM) signals are involved in the actual harmonics problem. In an OFDM style signaling system, the peak to average power ratio can become quite large. As an illustrative example, an OFDM system may exhibit a peak to average power ration of 7 to 1. Large peaks occur when peaks from multiple signals of different frequencies align in the time-domain. For cost effectiveness, efficiency of use of the full dynamic range, and other reasons, system designers will keep receive gain relatively high. As such, large peaks may be clipped (even without the presence of noise). Although the data signal may generate harmonics, when peaks occur, the harmonics produced (primarily odd harmonics) will fall out of the band of interest. However, when noise is produced by some various devices (such as those discussed above), odd harmonics of the noise may fall into the band of interest. For example, the third harmonic of 60 kHz is 180 kHz and third harmonic of 80 kHz is 240 kHz; both are in the band of interest. Lowering the noise level mitigates this issue.

Figure 3B:
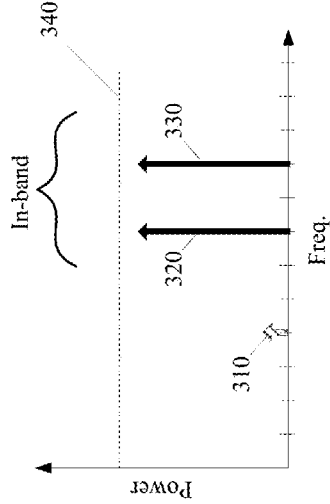
FIG. 3B shows the example set of communication signals of FIG. 3A with harmonic distortions that may be induced by processing out-of-band noise by a non-linear transfer function of a receiver.

FIG. 3B shows the set of communication signals of FIG. 3A, after processing by a non-linear transfer function of a receiver. As described with reference to FIG. 3A, peaks of signals 310, 320, and/or 330 may align to produce a large peak (e.g., having an amplitude that exceeds the maximum amplitude of the receiver). When processed by the receiver the large peak may be clipped, resulting in a non-linear transfer function. As a result of the clipping, noise signals 350 and 360 may be introduced as harmonic frequencies of the original noise signal 310. In this example, one of the noise signals falls within the in-band frequency range used for communication—thereby degrading performance.

FIG. 3C shows the set of communication signals of FIG. 3A after performing targeted out-of-band filtering, in accordance with one or more embodiments. As shown in FIG. 3C the filtering attenuates the amplitude of the noise signal 310.

FIG. 3D shows communication signals resulting from processing of the set of communication signals of FIG. 3C following processing by the receiver. As shown in FIG. 3D, because the amplitude of the out-of-band noise signal 310 is reduced, no clipping occurs and harmonic distortions are not introduced. It should be noted that the receiver may exhibit a non-linear transfer function even when no clipping occurs. For instance, as previously noted, an amplifier in the receiver may exhibit non-linearity due to non-ideal components. However, the amount of distortion introduced by the non-linear transfer function is proportional to the amplitude of the out-of-band noise signal 310 that is attenuated. Accordingly, the targeted out-of-band filtering and the resulting reduction in the amplitude of noise signal 310, substantially reduces the amount of noise that is introduced in the in-band frequency range. In this manner, performance of a PLC system is improved.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., a noise reduction circuit). For example, in certain of the above-discussed embodiments, one or more modules are discrete logic circuits or programmable logic circuits configured and arranged for implementing these operations/activities, as in the circuit modules shown in FIGS. 1 and 2. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a central processing unit (CPU) hardware-based circuit and a set of instructions in the form of firmware, where the first module includes a first CPU hardware circuit with one set of instructions and the second module includes a second CPU hardware circuit with another set of instructions.

Based upon the above discussion and illustrations, those skilled in the art will readily recognize that various modifications and changes may be made to the various embodiments without strictly following the exemplary embodiments and applications illustrated and described herein. For example, though aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the invention, including aspects set forth in the claims.

What is claimed is:

1. For use in a power line communication system, a power line communication circuit comprising:
    an analog front end circuit including
        a data-coupling circuit configured and arranged to communicatively couple communication signals between the data-coupling circuit and a set of alternating current (AC) power lines in the power line communication system, whereby the data-coupling circuit is used to communicate the communication signals carried by the power line communication system, and
        a noise reduction circuit coupled to the data-coupling circuit and configured and arranged to mitigate noise within a communication frequency band of the communication signals by filtering, from the communication signals, signals corresponding to a first frequency at 30 kHz that is located outside of the communication frequency band and that has harmonics located within the communication frequency band and by filtering signals corresponding to a second frequency, that is twice the first frequency located outside of the communication frequency band; and
    a receiver circuit coupled to the noise reduction circuit and configured and arranged to demodulate the filtered communication signals in the communication frequency band.

2. The power line communication circuit of claim 1, wherein the noise reduction circuit includes a first single-tuned shunt filter configured and arranged to filter the first frequency outside of the communication frequency band.

3. The power line communication circuit of claim 2, wherein the noise reduction circuit includes a second single-tuned shunt filter configured and arranged to filter the second frequency outside of the communication frequency band.

4. The power line communication circuit of claim 1, further comprises a band pass filter coupled to the noise reduction circuit.

5. The power line communication circuit of claim 4, wherein the band pass filter is configured to frequencies outside of a 100-450 kHz frequency band from the communication signals.

6. The power line communication circuit of claim 1, wherein the data-coupling circuit includes
    a transformer having primary and secondary windings; and
    a capacitor coupled in series with the primary winding of the transformer, the primary winding and the capacitor forming a high-pass filter.

7. The power line communication circuit of claim 1, further comprising a transmitter circuit configured to transmit data by modulating signals in the communication frequency band to produce an output communication signal.

8. The power line communication circuit of claim 7, further comprising a low-pass filter coupled to the transmitter circuit and configured and arranged to filter the output communication signal produced by the transmitter circuit.

9. The power line communication circuit of claim 8, wherein the low-pass filter has a corner frequency of 450 kHz.

10. The power line communication circuit of claim 7, further comprising an AC coupling capacitor connected to the noise reduction circuit and configured to communicate the output communication signal produced by the transmitter circuit to the noise reduction circuit.

11. The power line communication circuit of claim 1, wherein the communication frequency band includes a frequency band extending from 155 kHz to 403 kHz.

12. The power line communication circuit of claim 1, wherein the communication frequency band includes a frequency band extending from 160 kHz to 478 kHz.

13. The power line communication circuit of claim 1, wherein the communication frequency band includes a frequency band extending from 36 kHz to 90 kHz.

14. A method for communicating over a set of alternating current (AC) power lines, the method comprising:
    using a data-coupling circuit, retrieving communication signals from the set of AC power lines;
    mitigating noise within a communication frequency band of the communication signals by filtering, from the communication signals, signals corresponding to a first frequency at 30 kHz that is located outside of the communication frequency band and that has harmonics located within the communication frequency band and by filtering signals corresponding to a second frequency, that is twice the first frequency located outside of the communication frequency band; and
    demodulating the filtered communication signals in the communication frequency band to retrieve a set of data.

15. The method of claim 14, wherein the filtering includes filtering the first frequency located outside of the communication frequency band from the communication signals using a first single-tuned shunt filter.

16. The method of claim 15, wherein the filtering further includes filtering the second frequency located outside of the communication frequency band from the communication signals using a second single-tuned shunt filter.

17. The method of claim 14, further comprising: using a band-pass filter, filtering frequencies outside of the communication frequency band from the communication signals.

18. The method of claim 14, further comprising:
transmitting data by modulating signals in the communication frequency band to produce an output communication signal;
using a low-pass filter, filtering frequencies above the communication frequency band from the output communication signal; and
using the data-coupling circuit, providing the filtered output communication signal to the set of AC power lines.

* * * * *